US006726956B1

United States Patent
Meeks et al.

(10) Patent No.: US 6,726,956 B1
(45) Date of Patent: Apr. 27, 2004

(54) CERAMIC-COATED FIBERGLASS MEMBER AND METHOD FOR MANUFACTURING THE SAME

(76) Inventors: Russell John Meeks, 2909 SE. Silversprings Rd., Milwaukie, OR (US) 97222; Rodney Jay Wagner, 1515-17th Ave., Oregon City, OR (US) 97045; Lona Marie Jensen, 13906 SE. 122nd Ave., Clackamas, OR (US) 07015

( * ) Notice: Subject to any disclaimer, the term of this patent is extended or adjusted under 35 U.S.C. 154(b) by 171 days.

(21) Appl. No.: 10/032,192

(22) Filed: Dec. 20, 2001

(51) Int. Cl.[7] .............................. B05D 3/12; B05D 3/02; B05D 1/36
(52) U.S. Cl. .................. 427/307; 427/376.2; 427/380; 427/402; 427/419.3; 427/355
(58) Field of Search .............................. 427/307, 376.2, 427/380, 402, 419.3, 355

(56) References Cited

U.S. PATENT DOCUMENTS 3,948,294 A * 4/1976 Magarian et al. ............ 138/141
4,901,983 A * 2/1990 Larsson ....................... 266/270

OTHER PUBLICATIONS

Advertising brochure entitled: *Energy–Saving Ceramic Coatings and Fiber Modules* From: International Technical Ceramics, Inc. P.O. Box 1726, Ponte Vedra, FL 32004 Tel: (904) 285–0200, no date.

* cited by examiner

*Primary Examiner*—Michael Barr
(74) *Attorney, Agent, or Firm*—Marger Johnson & McCollom P.C.

(57) ABSTRACT

A ceramic-coated fiberglass member and method for manufacturing the same that withstands flames or high temperatures for a substantial period of time. A fiberglass pipe is washed and dried. The pipe is sanded axially along the lengthwise direction of the pipe to expose pores on the pipes. A first ceramic base coating is applied evenly on the pipe. Then, the first ceramic base coating is burnished into the pores. Next, the first ceramic base coating is dried so that substantially no moisture is left in the first ceramic base coating. The first ceramic base coating is axially burnished along the lengthwise direction of the pipe. Then, a second ceramic base coating is applied on the first ceramic base coating. The pipe is dried with first and second ceramic base coatings thereon. The pipe is burnished axially with first and second ceramic base coatings. Subsequently, a first ceramic top coating is applied evenly on the second ceramic base coating. The first ceramic top coating is dried so that substantially no moisture is left in the first ceramic top coating. The first ceramic top coating is burnished axially along the lengthwise direction of the pipe. A second ceramic top coating is applied evenly on the first ceramic top coating. The present invention ceramic-coated fiberglass pipe can withstand 900 degrees F. for over an hour, exceeding the requirement of U.S. Coast Guard (400 degrees F. of open flame for ten minutes) by more than twice.

13 Claims, 1 Drawing Sheet

CERAMIC-COATED FIBERGLASS MEMBER AND METHOD FOR MANUFACTURING THE SAME

FIELD OF THE INVENTION

The present invention relates to ceramic-coated fiberglass members such as fiberglass pipe. More particularly, it concerns ceramic-coated fiberglass members such as fiberglass pipes and methods for manufacturing ceramic-coated fiberglass members that can withstand high temperatures or flames.

BACKGROUND OF THE INVENTION

Recently, new ship building materials such as Carbon Fiber, Kevlar and their composites have been introduced because these materials do not rust, corrode or deteriorate and are thus ideal for shipbuilding. Furthermore, these new shipbuilding materials are stronger and lighter than conventional ship building materials such as iron or steel. For example, a 3½" diameter by 16" long steel pipe that weighs 9½ lbs can be replaced by a 3½" diameter by 16" fiberglass pipe that weighs 1¾ lbs. Thus, with these lighter shipbuilding materials, payload and fuel economy can be drastically improved.

However, these materials have some drawbacks. One of the drawbacks of these materials is that they are not fire-resistant; some extremely flammable. For this reason, attempts have been made to manufacture fiberglass or plastic members that overcome these drawbacks, withstanding flames or high temperatures for a substantial period of time. But, such attempts have not been very successful.

Accordingly, there is an immediate need for fiberglass or plastic members such as a fiberglass pipe that can overcome these drawbacks.

SUMMARY OF THE INVENTION

The present invention provides ceramic-coated fiberglass or plastic member and method for manufacturing the same that withstands flames or high temperatures for a substantial period of time. A fiberglass pipe is washed and dried. The pipe is sanded axially, i.e. along the lengthwise direction of the pipe, to expose pores on the pipes. A first ceramic base coating is applied evenly on the pipe. Then, the first ceramic base coating is burnished into the pores. Next, the first ceramic base coating is dried such that substantially no moisture is left in the first ceramic base coating. The first ceramic base coating is axially burnished along the lengthwise direction of the pipe. Then, a second ceramic base coating is applied on the first ceramic base coating. The pipe is dried with first and second ceramic base coatings thereon. The pipe is axially burnished with first and second ceramic base coatings. Subsequently, a first ceramic top coating is applied evenly on the second ceramic base coating. The first ceramic top coating is dried such that substantially no moisture is left in the first ceramic top coating. The first ceramic top coating is axially burnished. A second ceramic top coating is applied evenly on the first ceramic top coating.

BRIEF DESCRIPTION OF THE DRAWINGS

The advantages of the present invention will become more apparent by describing in detail a preferred embodiment thereof with reference to the attached drawings in which.

DETAILED DESCRIPTION

Figure 1:
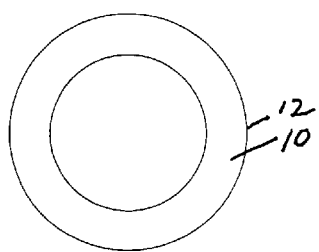
FIG. 1 is a cross-sectional view of a fiberglass pipe in accordance with an embodiment of the present invention.

Referring to FIG. 1, in accordance with an embodiment of the present invention, a fiberglass member such as fiberglass pipe 10 is washed thoroughly with an organic solvent such as Methyl-Ethyl-Ketone to provide a contaminant-free surface 12 thereof. The pipe 10 is preferably a fiberglass reinforced epoxy thermosetting-resin pipe such as one from SMITH Fibercast® of Sand Springs, Okla. However, a person skilled in the art will appreciate that any other fiberglass or plastic pipe having similar properties can be substituted.

Next, the pipe 10 is dried using conventional techniques. Then, the pipe 10 is sanded axially (lengthwise) along the straight direction of the pipe 10 with sand paper such as a 36 grit dry sand paper. This sanding process should preferably not be performed circumferentially, that is, along the curved direction of the pipe. Through this sanding, pores that exist in the pipe 10 are exposed, so that the outer surface 12 of the pipe 10 becomes porous. Consequently, a ceramic coating material can infiltrate (permeate) into the exposed pores of the pipe 10 or the porous surface to form a ceramic-embedded fiberglass surface as discussed below.

Subsequently, all sanding residue is blown off the surface of the pipe 10 with clean dry air using conventional techniques.

Figure 2:
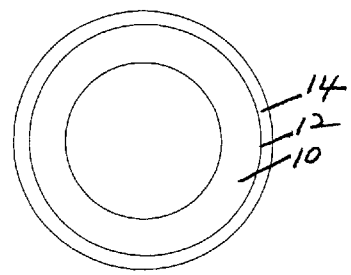
FIG. 2 a cross-sectional view of a fiberglass pipe coated with a first ceramic base coating in accordance with an embodiment of the present invention.

As shown in FIG. 2, a first ceramic base coating 14 is coated evenly on the porous surface 12 of the pipe 14 with a thickness of approximately 0.010 inch using convention techniques such as a spray gun technique or a technique using a slightly damp cloth.

The first ceramic base coating 14 comprises a slurry including silica and porcelain clay. The first ceramic base coating 14 preferably comprises a mixture of ITC 213 coating material from International Technical Ceramics, Inc. ("ITC") and water. However, one skilled in the art will appreciate that other ceramic coating materials having similar properties can also be used. The ratio of ITC 213 coating material to water is preferably approximately 1:1. Also, a person skilled in the art will understand that in some cases more water can be added depending on temperature and humidity conditions.

Then, the first ceramic base coating 14 is burnished axially along the straight direction of the pipe 10 and thus the first ceramic base coating permeates or infiltrates the exposed pores or porous surface of fiberglass pipe 10. Consequently, the first ceramic base coating 14 forms a ceramic-embedded porous fiberglass surface. This structure of the present invention provides strong adhesion between the first ceramic base coating and the subsequent ceramic base coating to be formed thereon, as discussed above. If spray is used, the porous surface of the fiberglass pipe is preferably burnished with a damp cloth after the spraying.

Then, the pipe 10 with the first ceramic base coating 14 is air-dried for approximately eight (8) hours in 70 degree Fahrenheit or higher with not more than 50% humidity. If the humidity is greater than 50%, a curing time of one to several additional hours may be required depending on drying conditions. In this process, substantially no moisture should preferably be left in the first ceramic base coating 14 so that no moisture would break through a second ceramic base coating 16 (See FIG. 3) to be coated thereon. Otherwise, the first ceramic base coating 14 might need to be stripped and the whole process started over again.

Next, before applying the second ceramic base coating 16, the outer surface of the first ceramic base coating 14 is burnished (rubbed or polished) axially with the grain with an abrasive pad such as a green Scotch Brite® pad from 3M®.

Figure 3:
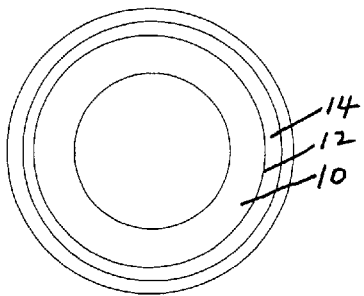
FIG. 3 is a cross-sectional view of a fiberglass pipe coated with first and second ceramic base coatings in accordance with an embodiment of the present invention.

Referring to FIG. 3, residue on the first ceramic base coating 14 is removed with clean dry air. Then, a second ceramic base coating 16 having a thickness of approximately 0.010 inch is coated on the first ceramic base coating 14 in the same manner as the first ceramic base coating 14. The second ceramic base coating 16 preferably comprises the same material as first ceramic base coating 14, i.e. ITC 213 and water (approximately 1:1). The pipe 10 with first and second ceramic base coatings 14, 16 is dried in the same manner as the first ceramic base coating 14.

Optionally, after the second ceramic base coating 16 is dried, inspection can be done for any areas that might not be completely covered with coatings. Then, repair can be done for areas by pre-treating the resulting pipe structure with a Scotch Brite® pad and applying additional ceramic base coating, preferably not over approximately 0.010 inch thick.

Then, the pipe 10 with first and second ceramic base coatings 14, 16 is burnished with a Scotch Brite® pad and is subsequently cleaned with dry air.

Figure 4:
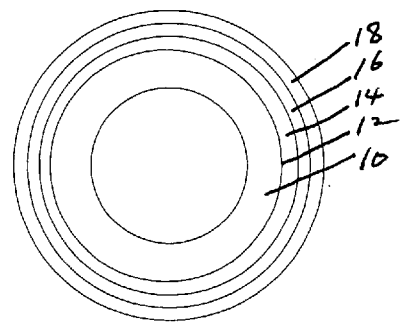
FIG. 4 is a cross-sectional view of a fiberglass pipe with a first ceramic top coating coated on the first and second ceramic base coatings in accordance with an embodiment of the present invention.

As illustrated in FIG. 4, a first ceramic top coating 18 is coated (applied) evenly on the second ceramic base coating 16 with a thickness of approximately 0.010 inch in the same manner as the first and second ceramic base coatings 14, 16. The first ceramic top coating 18 comprises a slurry including silica and porcelain clay. The ceramic top coating 18 preferably comprises a mixture of ITC 296A from International Technical Ceramics, Inc. ("ITC") and water. However, one skilled in the art will appreciate that other ceramic coating materials having similar properties can be used. The ratio of ITC 296A to water is preferably approximately 1:1. Also, a person skilled in the art will understand that in some cases more water must be added depending on temperature and humidity conditions.

Next, the first ceramic top coating 18 is air-dried and burnished in the same manner as the first ceramic base coating 14 is treated before the second ceramic base coating is applied thereon.

Figure 5:
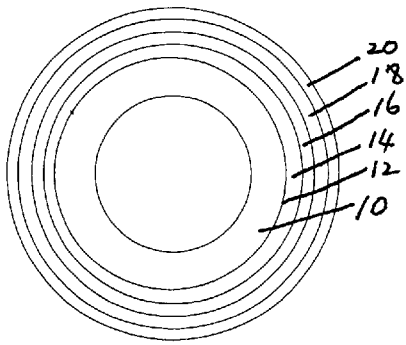
FIG. 5 is a cross-sectional view of a fiberglass pipe with a second ceramic top coating coated on the first ceramic top coating in accordance with an embodiment of the present invention.

Referring to FIG. 5, a second ceramic top coating 20 comprising the same material as the first ceramic top coating 18 is then applied on the first ceramic top coating 18.

After air-drying the resulting ceramic-coated pipe for eight (8) hours, the ceramic-coated pipe is inspected for any popping-through or breaking-through of the surface. If no such popping or breaking-through occurs, the ceramic-coated pipe can be put into use. However, if upon inspection, break-through or cracking is found in the coatings, all coatings should be removed by sandblasting and the process should start again from the very beginning. In this case, all coatings can be removed by blasting with a hard abrasive material such as aluminum oxide.

According to another embodiment of the present invention, an additional ceramic coating can be applied after burnishing the incomplete coating if there were any areas that were not completely covered.

Thus, the total thickness of the ceramic coatings is preferably between approximately 0.040 and 0.050 inch thick. With the foregoing treatment, the ceramic-coated fiberglass or plastic pipe can be prevented from burning at 900 degrees F. while maintaining flexibility.

A ceramic-coated fiberglass pipe formed according to a preferred embodiment of the present invention withstands 900 degrees F. for over an hour, exceeding the requirement of U.S. Coast Guard (400 degrees F. of open flame for ten minutes).

Accordingly, having illustrated and described the principles of our invention in a preferred embodiment thereof, it should be readily apparent to those skilled in the art that the invention can be modified in arrangement and detail without departing from such principles. We claim all modifications coming within the spirit and scope of the accompanying claims.

What is claimed is:

1. A method of manufacturing a ceramic-coated fiberglass pipe, comprising:

washing and drying a fiberglass pipe;

sanding the pipe axially along the lengthwise direction to expose pores on the pipes;

applying a first ceramic base coating evenly on the pipe;

axially burnishing the first ceramic base coating into the pore;

drying the first ceramic base coating such that substantially no moisture is left in the first ceramic base coating;

axially burnishing the first ceramic base coating along the lengthwise direction of the pipe;

applying a second ceramic base coating on the first ceramic base coating; and drying the pipe with first and second ceramic;base coatings coated thereon.

2. The method of claim 1, wherein the first ceramic base coating comprises a slurry including silica, porcelain clay, and water.

3. The method of claim 1, wherein the first or second ceramic base coating is formed to a thickness of approximately 0.010 inch thick.

4. The method of claim 1, wherein the second ceramic base coating material is formed of the same material as the first ceramic top coating material.

5. The method of claim 1, further comprising:

axially burnishing the pipe with first and second ceramic base coatings;

applying a first ceramic top coating evenly on the second ceramic base coating; and drying the first ceramic top coating such that substantially no moisture is left in the first ceramic top coating.

6. The method of claim 5, further comprising:

axially burnishing the first ceramic top coating along the direction of the pipe; and applying a second ceramic top coating evenly on the first ceramic top coating.

7. The method of claim 6, wherein the first or second ceramic top coating is formed to a thickness of approximately 0.010 inch thick.

8. The method of claim 6, wherein the first ceramic top coating comprises a slurry including silica, porcelain clay, and water.

9. The method of claim 6, wherein the second ceramic top coating comprises the same material as first ceramic top coating.

10. The method of claim 6, wherein the first and second ceramic top coatings or base coatings are formed to a combined thickness of approximately 0.020 inch.

11. The method of claim 6, wherein the first and second ceramic base coatings and the first and second ceramic top coatings are formed to a combined thickness of approximately 0.040 inch.

12. The method of claim 1, wherein the pipe is a fiberglass reinforced epoxy thermosetting-resin pipe.

13. The method of claim 1, wherein the drying the pipe is performed for approximately eight (8) hours in 70 degree Fahrenheit or above with not more than 50% humidity.

* * * * *

UNITED STATES PATENT AND TRADEMARK OFFICE
CERTIFICATE OF CORRECTION

PATENT NO. : 6,726,956 B1
DATED : April 27, 2004
INVENTOR(S) : Meeks et al.

It is certified that error appears in the above-identified patent and that said Letters Patent is hereby corrected as shown below:

<u>Column 4,</u>
Line 43, "second ceramic;base" should read -- second ceramic base --.

Signed and Sealed this

Twelfth Day of October, 2004

JON W. DUDAS
*Director of the United States Patent and Trademark Office*